(12) United States Patent
Nitani et al.

(10) Patent No.: US 9,829,093 B2
(45) Date of Patent: Nov. 28, 2017

(54) CONTROL APPARATUS FOR VEHICLE

(71) Applicant: TOYOTA JIDOSHA KABUSHIKI KAISHA, Toyota-shi, Aichi-ken (JP)

(72) Inventors: Hiromitsu Nitani, Nagakute (JP); Atsushi Ayabe, Toyota (JP); Kazuya Sakamoto, Toyota (JP); Hiroki Kondo, Miyoshi (JP); Mitsuhiro Fukao, Toyota (JP); Kenji Matsuo, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 26 days.

(21) Appl. No.: 15/105,990

(22) PCT Filed: Dec. 19, 2014

(86) PCT No.: PCT/IB2014/002931
§ 371 (c)(1),
(2) Date: Jun. 17, 2016

(87) PCT Pub. No.: WO2015/097549
PCT Pub. Date: Jul. 2, 2015

(65) Prior Publication Data
US 2016/0334010 A1 Nov. 17, 2016

(30) Foreign Application Priority Data
Dec. 24, 2013 (JP) .................................. 2013-266098

(51) Int. Cl.
*F16H 61/02* (2006.01)
*B60K 17/08* (2006.01)
(Continued)

(52) U.S. Cl.
CPC ......... *F16H 61/0213* (2013.01); *B60K 17/08* (2013.01); *B60K 17/165* (2013.01);
(Continued)

(58) Field of Classification Search
CPC .............. F16H 37/022; F16H 61/0213; F16H 2061/0234; F16H 2061/0474; F16H 2702/06
See application file for complete search history.

(56) References Cited

U.S. PATENT DOCUMENTS

| 2003/0190995 | A1* | 10/2003 | Aoki | ........................ B60K 6/44 477/5 |
| 2007/0275810 | A1 | 11/2007 | Sinojima et al. | |
| 2012/0072064 | A1* | 3/2012 | Kumazaki | ........... F16H 61/0213 701/22 |

FOREIGN PATENT DOCUMENTS

| CA | 2873020 A1 | 11/2013 |
| DE | 19915200 A1 | 10/2000 |

(Continued)

*Primary Examiner* — Edwin A Young
(74) *Attorney, Agent, or Firm* — Oliff PLC

(57) ABSTRACT

A first transmission mechanism provided on a first power transmission path and a second transmission mechanism provided on a second power transmission path are provided in parallel with each other between a driving force source and a drive wheel. A first clutch mechanism transmits power or interrupts transmission of power in the first power transmission path. A dog clutch equipped with a synchromesh mechanism transmits power or interrupts transmission of power in the second power transmission path. An electronic control unit is configured to, when changing from the first transmission path to the second transmission path a state where the vehicle is stopping or is stationary and in a state where power of the driving force source is transmitted via the first transmission mechanism, actuate the first clutch mechanism and the second clutch mechanism such that the first clutch mechanism is released and the second clutch mechanism engages.

4 Claims, 10 Drawing Sheets

(51) Int. Cl.
  *B60K 17/16*   (2006.01)
  *F16H 61/04*   (2006.01)
  *F16H 37/02*   (2006.01)

(52) U.S. Cl.
  CPC .......... *F16H 37/022* (2013.01); *F16H 61/04*
      (2013.01); *F16H 2037/026* (2013.01); *F16H*
        *2061/0234* (2013.01); *F16H 2061/047*
        (2013.01); *F16H 2061/0474* (2013.01)

(56) References Cited

FOREIGN PATENT DOCUMENTS

| | | | |
|---|---|---|---|
| JP | H01-216152 A | 8/1989 | |
| JP | 2006-153235 A | 6/2006 | |
| JP | 2010-281423 A | 12/2010 | |
| JP | 2011-122671 A | 6/2011 | |

\* cited by examiner

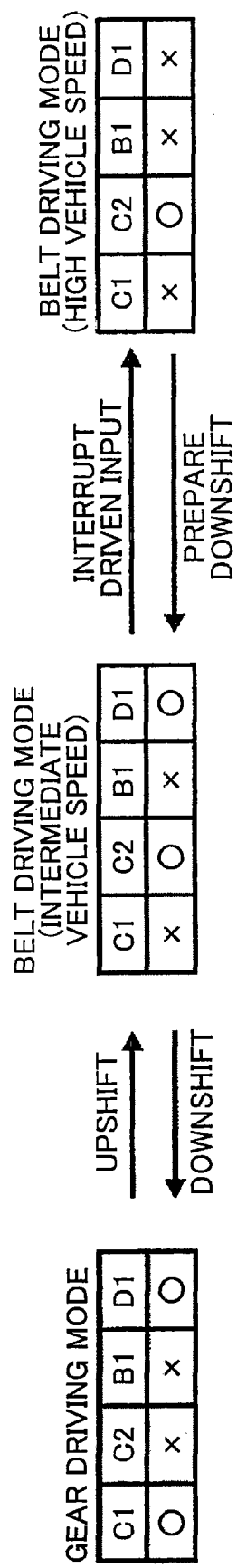

CONTROL APPARATUS FOR VEHICLE

BACKGROUND OF THE INVENTION

1. Field of the Invention

The invention relates to a control apparatus for a vehicle including a first transmission mechanism and a second transmission mechanism provided in parallel with each other between a driving force source and a drive wheel.

2. Description of Related Art

There is well known a vehicle including a dog clutch equipped with a synchromesh mechanism. The dog clutch transmits power or interrupts transmission of power in a power transmission path that transmits power of a driving force source to a drive wheel side. This is, for example, the vehicle described in Japanese Patent Application Publication No. 2010-281423 (JP 2010-281423 A). JP 2010-281423 A describes that a target speed stage into which a speed stage is shifted is established by activating the synchromesh mechanism. That is, a synchronizer ring is pressed against a friction face of a cone of a synchronized-side gear (hereinafter, referred to as synchronized gear) in the target speed stage by moving a synchronizer sleeve toward the synchronized gear. Thus, the synchronizer ring is synchronized with the synchronized gear, and the synchronizer sleeve is meshed with the synchronized gear.

SUMMARY OF THE INVENTION

In the dog clutch equipped with the synchromesh mechanism, after the synchronizer ring is synchronized with the synchronized gear as a result of movement of the sleeve, spline teeth provided on the inner periphery of the sleeve are meshed with spline teeth provided on the synchronizer ring and further meshed with spline teeth provided on the synchronized gear. Thus, the dog clutch is engaged. However, when the sleeve is moved to mesh the spline teeth, an uplock may occur. The uplock is such an engagement fault of the dog clutch (synchromesh mechanism) that the tooth tips of the spline teeth contact each other, so the spline teeth cannot be meshed with each, other, resulting in a state where the dog clutch is not engaged. In such a case, it is not possible to establish a desired gear stage (speed stage). In terms of the structure of the synchromesh mechanism, the frequency of occurrence of an uplock in engagement operation at the time when rotation of the synchronized gear, or the like, is stopped, for example, during a stop of a vehicle, is higher than that at the time when the synchronized gear, or the like, is rotating. The above-described inconvenience is not publicly known.

The invention provides a control apparatus for a vehicle, which is able to establish a desired gear stage by appropriately avoiding an uplock of a dog clutch even during a stop of the vehicle.

A first aspect of the invention provides a control apparatus for a vehicle. The vehicle includes a driving force source; at least one drive wheel; a first transmission mechanism provided on a first power transmission path, the first power transmission path being defined between the driving force source and the drive wheel; a second transmission mechanism provided on a second power transmission path, the second power transmission path being defined between the driving force source and the drive wheel, the second transmission mechanism being provided in parallel with the first transmission mechanism; a first clutch mechanism configured to transmit power or interrupt transmission of power in the first power transmission path; and a second clutch mechanism configured to transmit power or interrupt transmission of power in the second power transmission path, the second clutch mechanism being a dog clutch equipped with a synchromesh mechanism. An electronic control unit is configured to (a) when the electronic control unit switches transmission of power from the first transmission path to the second transmission path while the vehicle is traveling, actuate the second clutch mechanism and the first clutch mechanism such that the second clutch mechanism engages and then the first clutch mechanism is released, and (b) when the electronic control unit switches the transmission of power from the first transmission path to the second transmission path in a state where the vehicle is stopping or is stationary and in a state where power of the driving force source is transmitted to the drive wheel via the first transmission mechanism, actuate the first clutch mechanism and the second clutch mechanism such that the first clutch mechanism is released and the second clutch mechanism engages.

According to the above aspect, while the vehicle is traveling, it is possible to appropriately engage the second clutch mechanism (that is, the dog clutch equipped with the synchromesh mechanism) in preparation for switching the transmission of power from the transmission of power via the first transmission mechanism to the transmission of power via the second transmission mechanism. While the vehicle is stopping or is stationary, by releasing a shaft torsional torque generated in the first power transmission path as a result of a stop of the vehicle in a state where power of the driving force source is transmitted via the first transmission mechanism, it is possible to rotate a drive wheel-side rotating member of the dog clutch, which is connected to a power transmission path on the drive wheel side with respect to the first clutch mechanism (for example, it is possible to rotate the drive wheel-side rotating member by the amount of a backlash of a meshing portion between gears in the power transmission path). Thus, even during a stop of the vehicle, it is possible to appropriately avoid an uplock of the dog clutch and establish a desired gear stage by the second transmission mechanism.

In the above aspect, the electronic control unit may be configured to, when the electronic control unit switches the transmission of power from the first transmission path to the second transmission path in a state where the vehicle is stopping or is stationary and in a state where power of the driving force source is transmitted to the drive wheel via the first transmission mechanism, release the first clutch mechanism and then engage the first clutch mechanism again. According to the above aspect, by releasing the first clutch mechanism, it is possible to rotate the driving force-side rotating member of the first clutch mechanism by the driving force source. By engaging the first clutch mechanism again in this state, it is possible to transmit power to the drive wheel-side rotating member of the dog clutch (in other words, it is possible to apply external force to the drive wheel-side rotating member of the dog clutch). Thus, it is possible to further rotate the drive wheel-side rotating member of the dog clutch, so it is possible to increase the probability of avoiding an uplock in the dog clutch at the time when the second clutch mechanism is actuated to the engaged side.

In the above aspect, the first transmission mechanism may be a continuously variable transmission mechanism. The first clutch mechanism may be provided on the drive wheel side with respect to the first transmission mechanism. The electronic control unit may be configured to, when the electronic control unit switches the transmission of power from the first transmission path to the second transmission path in a state where the vehicle is stopping or is stationary and in a state where power of the driving force source is transmitted to the drive wheel via the first transmission mechanism, upshift the first transmission mechanism in a state where the first clutch mechanism is released and then engage the first clutch mechanism again. According to the above aspect, by releasing the first clutch mechanism, it is possible to rotate the first transmission mechanism (continuously variable transmission mechanism) by the driving force source. In this state, by upshifting the continuously variable transmission mechanism, it is possible to increase the rotation speed on the drive wheel side of the continuously variable transmission mechanism. By engaging the first clutch mechanism again, it is possible to apply further large external force to the drive wheel-side rotating member of the dog clutch in comparison with the state where the continuously variable transmission mechanism is not upshifted. That is, it is possible to further effectively apply external force to the drive wheel-side rotating member of the dog clutch. Thus, it is possible to further reliably rotate the drive wheel-side rotating member of the dog clutch, so it is possible to further increase the probability of avoiding an uplock in the dog clutch at the time when the second clutch mechanism is actuated to the engaged side.

In the above aspect, a gear ratio that is established by the second transmission mechanism may be a lower gear ratio than a lowest gear ratio that is established by the first transmission mechanism. The electronic control unit may be configured to, when the electronic control unit requires the gear ratio that is lower than the lowest gear ratio that is established by the first transmission mechanism in a state where the vehicle is stopping or is stationary and in a state where power of the driving force source is transmitted to the drive wheel via the first transmission mechanism, switch the transmission of power from the transmission of power via the first transmission mechanism to the transmission of power via the second transmission mechanism. The electronic control unit may be configured to, when the electronic control unit does not require the gear ratio that is lower than the lowest gear ratio that is established by the first transmission mechanism in a state where the vehicle is stopping or is stationary and in a state where power of the driving force source is transmitted to the drive wheel via the first transmission mechanism, maintain the transmission of power via the first transmission mechanism. According to the above aspect, in a situation that there is a possibility that a desired driving force suitable for the start of the vehicle in a vehicle state at that time is not obtained because the vehicle stops in a state where power of the driving force source is transmitted via the first transmission mechanism, when the vehicle is not allowed to start moving at the lowest vehicle speed-side gear ratio that is established by the first transmission mechanism, the transmission of power is switched from the transmission of power via the first transmission mechanism to the transmission of power via the second transmission mechanism. Therefore, a desired driving force suitable for the start of the vehicle is obtained. When it is allowed to start moving at the lowest vehicle speed-side gear ratio that is established by the first transmission mechanism, transmission of power via the first transmission mechanism is maintained. Therefore, a desired driving force suitable for the start of the vehicle is quickly obtained.

BRIEF DESCRIPTION OF THE DRAWINGS

Features, advantages, and technical and industrial significance of exemplary embodiments of the invention will be described, below with reference to the accompanying drawings, in which like numerals denote like elements, and wherein:

FIG. 2 is a view for illustrating changes in driving pattern of a power transmission system;

DETAILED DESCRIPTION OF EMBODIMENTS

Hereinafter, embodiments of the invention will be described in detail with reference to the accompanying drawings.

Figure 1:
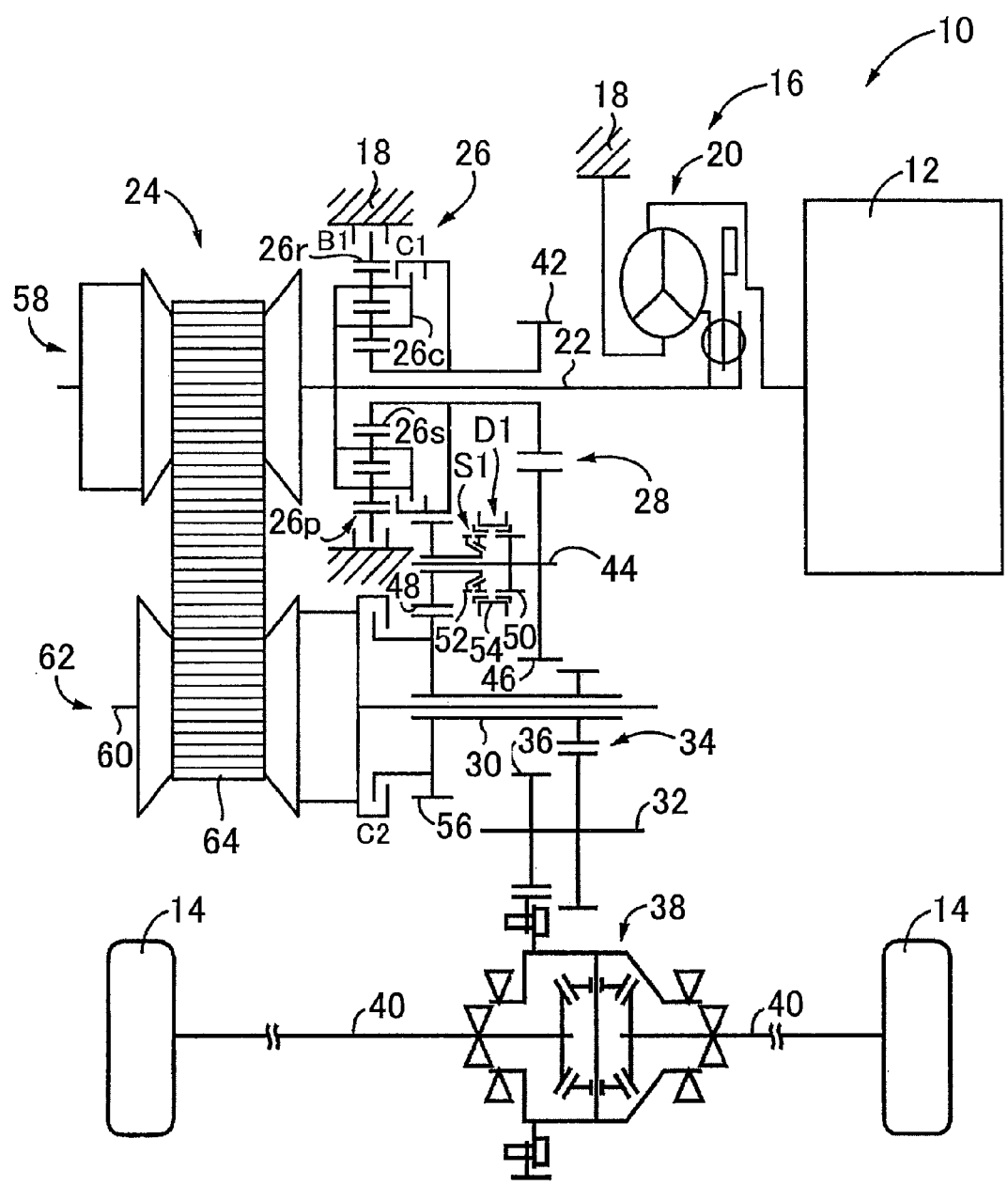
FIG. 1 is a view that illustrates the schematic, configuration of a vehicle to which the invention is applied.

FIG. 1 is a view that illustrates the schematic configuration of a vehicle 10 to which the invention (first embodiment) is applied. As shown in FIG. 1, the vehicle 10 includes an engine 12, drive wheels 14 and a power transmission system 16. The engine 12 functions as a driving force source for propelling the vehicle 10. The power transmission system 16 is provided between the engine 12 and the drive wheels 14. The power transmission system 16 includes a known torque converter 20, an input shaft 22, a known belt-type continuously variable transmission 24 (hereinafter, referred to as continuously variable transmission 24), a forward/reverse switching device 26, a gear mechanism 28, an output shaft 30, a counter shaft 32, a reduction gear unit 34, a differential gear 38, a pair of axles 40, and the like. The torque converter 20 serves as a fluid transmission device coupled to the engine 12 in a housing 18 that serves as a non-rotating member. The input shaft 22 is provided integrally with a turbine shaft that is an output rotating member of the torque converter 20. The continuously variable transmission 24 is a continuously variable transmission mechanism coupled to the input shaft 22, and serves as a first transmission mechanism. The forward/reverse switching device 26 is coupled to the input shaft 22. The gear mechanism 28 is coupled to the input shaft 22 via the forward/reverse switching device 26, and is provided in parallel with the continuously variable transmission 24. The gear mechanism 28 serves as a second transmission mechanism. The output shaft 30 is an output rotating member common to the continuously variable transmission 24 and the gear mechanism 28. The reduction gear unit 34 is formed of a pair of gears that are respectively provided on the output shaft 30 and the counter shaft 32 so as to be relatively non-rotatable and that are in mesh with each other. The differential gear 38 is coupled to a gear 36. The gear 36 is provided on the counter shaft 32 so as to be relatively non-rotatable. The pair of axles 40 are coupled to the differential gear 38. In the thus configured power transmission system 16, power of the engine 12 (when not specifically distinguished from one another, power is synonymous with torque and force) is transmitted to the pair of drive wheels 14 sequentially via the torque converter 20, the continuously variable transmission 24 or gear mechanism 28, the reduction gear unit 34, the differential gear 38, the axles 40, and the like.

In this way, the power transmission system 16 includes the continuously variable transmission 24 and the gear mechanism 28 provided in parallel with each other between the engine 12 (which means the same as the input shaft 22 that is an input rotating member common to the continuously variable transmission 24 and the gear mechanism 28) and the drive wheels 14 (which means the same as the output shaft 30). Thus, the power transmission system 16 includes a first power transmission path and a second power transmission path. The first power transmission path transmits power of the engine 12 from the input shaft 22 to the drive wheels 14 side (that is, the output shaft 30) via the continuously variable transmission 24. The second power transmission path transmits power of the engine 12 from the input shaft 22 to the drive wheels 14 side (that is, the output shaft 30) via the gear mechanism 28. The power transmission system 16 is configured to change the power transmission path from the engine 12 to the drive wheels 14 on the basis of a traveling state of the vehicle 10. Therefore, the power transmission system 16 includes a belt driving clutch C2 and a dog clutch D1. The belt driving clutch C2 transmits power or interrupts transmission of power in the first power transmission path, and serves as a first clutch mechanism. The dog clutch D1 transmits power or interrupts transmission of power in the second power transmission path, and serves as a second clutch mechanism.

The forward/reverse switching device 26 is mainly formed of a double-pinion-type planetary gear train 26p, a forward clutch C1 and a reverse brake B1. A carrier 26c of the planetary gear train 26p is integrally coupled to the input shaft 22. A ring gear 26r of the planetary gear train 26p is selectively coupled to the housing 18 via the reverse brake B1. A sun gear 26s of the planetary gear train 26p is coupled to a small-diameter gear 42. The small-diameter gear 42 is provided around the input shaft 22 coaxially with the input shaft 22 so as to be relatively rotatable. The carrier 26c and the sun gear 26s are selectively coupled to each other via the forward clutch C1. Each of the forward clutch C1 and the reverse brake B1 is an example of a separating device, and is a known hydraulic friction device that is frictionally engaged by a hydraulic actuator. In the thus configured forward/reverse switching device 26, when the forward clutch C1 is engaged and the reverse brake B1 is released, the input shaft 22 is directly coupled to the small-diameter gear 42, and a forward power transmission path is established (achieved) in the second power transmission path. When the reverse brake B1 is engaged and the forward clutch C1 is released, the small-diameter gear 42 is rotated in a direction opposite to the rotation direction of the input shaft 22, and a reverse power transmission path is established in the second power transmission path. When both the forward clutch C1 and the reverse brake B1 are released, the second power transmission path is set to a neutral state in which transmission of power is interrupted (power transmission interrupted state). Because the forward/reverse switching device 26 is interposed in the second power transmission path, the forward clutch C1 and the reverse brake B1 function as a third clutch mechanism that is provided in the power transmission system 16 and that transmits power or interrupts transmission of power in the second power transmission path.

The gear mechanism 28 includes the small-diameter gear 42 and a large-diameter gear 46. The large-diameter gear 46 is provided on a gear mechanism counter shaft 44 so as to be relatively non-rotatable. An idler gear 48 is provided around the gear mechanism counter shaft 44 coaxially with the gear mechanism counter shaft 44 so as to be relatively rotatable. The dog clutch D1 is provided around the gear mechanism counter shaft 44 between the gear mechanism counter shaft 44 and the idler gear 48, and selectively connects the gear mechanism counter shaft 44 to the idler gear 48, or disconnects the gear mechanism counter shaft 44 from the idler gear 48. Specifically, the dog clutch D1 includes a first gear 50, a second gear 52 and a hub sleeve 54. The first gear 50 is formed on the gear mechanism counter shaft 44. The second gear 52 is formed on the idler gear 48. Internal teeth are formed in the hub sleeve 54, and are fittable (engageable, meshable) to these first gear 50 and second gear 52. In the thus configured dog clutch D1, when the hub sleeve 54 is fitted to these first gear 50 and second gear 52, the gear mechanism counter shaft 44 is connected to the idler gear 48. The dog clutch D1 further includes a synchromesh mechanism S1 that serves as a synchronization mechanism. The synchromesh mechanism S1 synchronizes rotations at the time of fitting the first gear 50 to the second gear 52. The idler gear 48 is in mesh with an output gear 56 having a larger diameter than the idler gear 48. The output gear 56 is provided around the same rotation axis as that of the output shaft 30 so as to be relatively non-rotatable with respect to the output shaft 30. When one of the forward clutch C1 and the reverse brake. B1 is engaged and the dog clutch D1 is engaged, the second power transmission path is established (connected). In the second power transmission path, power of the engine 12 is transmitted from the input shaft 22 to the output shaft 30 sequentially via the forward/reverse switching device 26, the gear mechanism 28, the idler gear 48 and the output gear 56.

The continuously variable transmission 24 is provided in a power transmission path between the input shaft 22 and the output shaft 30. The continuously variable transmission 24 includes a primary pulley 58, a secondary pulley 62 and a transmission belt 64. The primary pulley 58 is provided on the input shaft 22, and has a variable effective diameter. The secondary pulley 62 is provided on a rotary shaft 60 coaxial with the output shaft 30, and has a variable effective diameter. The transmission belt 64 is wound around the pair of variable pulleys 58, 62. The continuously variable transmission 24 transmits power via friction force between the pair of variable pulleys 58, 62 and the transmission belt 64. In the continuously variable transmission 24, the V-groove width of, each of the pair of variable pulleys 58, 62 changes, and the winding diameter (effective diameter) of the transmission belt 64 is changed. Thus, a speed ratio (gear ratio) $\gamma$ (=Input shaft rotation speed Ni/Output shaft rotation speed No) is continuously changed. For example, when the V-groove width of the primary pulley 58 is reduced, the gear ratio $\gamma$ reduces (that is, the continuously variable transmission 24 is upshifted). When the V-groove width of the primary pulley 58 is increased, the gear ratio $\gamma$ increases (that is, the continuously variable transmission 24 is downshifted). The output shaft 30 is arranged around the rotary shaft 60 coaxially with the rotary shaft 60 so as to be relatively rotatable. The belt driving clutch C2 is provided on the drive wheels 14 side with respect to the continuously variable transmission 24, and selectively connects the secondary pulley 62 to the output shaft 30 or disconnects the secondary pulley 62 from the output shaft 30. That is, the belt driving clutch C2 is provided between the secondary pulley 62 and the output shaft 30. When the belt driving clutch C2 is engaged, the first power transmission path is established (connected). In the first power transmission path, power of the engine 12 is transmitted from the input shaft 22 to the output shaft 30 via the continuously variable transmission 24.

The operation of the power transmission system 16 will be described below. FIG. 2 is a view for illustrating changes in driving pattern of the power transmission system 16 by using an engagement chart of engagement elements for each driving pattern. In FIG. 2, C1 corresponds to the operation state of the forward clutch C1, C2 corresponds to the operation state of the belt driving clutch C2, B1 corresponds to the operation state of the reverse brake B1, D1 corresponds to the operation state of the dog clutch D1, "O" indicates an engaged (connected) state, and "x" indicates a released (disconnected) state.

Initially, a gear driving mode that is the drying pattern in which power of the engine 12 is transmitted to the output shaft 30 via the gear mechanism 28 (that is, the driving pattern in which power is transmitted via the second power transmission path) will be described. In this gear driving mode, as shown in FIG. 2, for example, the forward clutch C1 and the dog clutch D1 are engaged, while the belt driving clutch C2 and the reverse brake B1 are released.

Specifically, when the forward clutch C1 is engaged, the planetary gear train 26p that constitutes the forward/reverse switching device 26 is integrally rotated, so the small-diameter gear 42 is rotated at the same rotation speed as the input shaft 22. Because the small-diameter gear 42 is in mesh with the large-diameter gear 46 provided on the gear mechanism counter shaft 44, the gear mechanism counter shaft 44 is also similarly rotated. Because the dog clutch D1 is engaged, the gear mechanism counter shaft 44 and the idler gear 48 are connected to each other. Because the idler gear 48 is in mesh with the output gear 56, the output shaft 30 provided integrally with the output gear 56 is rotated. In this way, when the forward clutch C1 and the dog clutch D1 are engaged, power of the engine 12 is transmitted to the output shaft 30 sequentially via the torque converter 20, the forward/reverse switching device 26, the gear mechanism 28, the idler gear 48, and the like. In this gear driving mode, for example, when the reverse brake B1 and the dog clutch D1 are engaged, and the belt driving clutch C2 and the forward clutch C1 are released, reverse traveling is enabled.

Subsequently, a belt driving mode that is the driving pattern in which power of the engine 12 is transmitted to the output shaft 30 via the continuously variable transmission 24 (that is, the driving pattern in which power is transmitted via the first power transmission path) will be described. In this belt driving mode, as shown in the belt driving mode (high vehicle speed) of FIG. 2, for example, the belt driving clutch C2 is engaged, while the forward clutch C1, the reverse brake B1 and the dog clutch D1 are released.

Specifically, when the belt driving clutch C2 is engaged, the secondary pulley 62 is connected to the output shaft 30, so the secondary pulley 62 and the output shaft 30 are integrally rotated. In this way, when the belt driving clutch C2 is engaged, power of the engine 12 is transmitted to the output shaft 30 sequentially via the torque converter 20, the continuously variable transmission 24, and the like. The reason why the dog clutch D1 is released during the belt driving mode (high vehicle speed) is to, for example, eliminate a drag of the gear mechanism 28, and the like, during the belt driving mode and prevent high rotation of the gear mechanism 28, and the like, at a high vehicle speed.

The gear driving mode is, for example, selected in a low vehicle speed region including a state during a stop of the vehicle. A gear ratio γ1 (that is, a gear ratio established by the gear mechanism 28) in this second power transmission path is set to a value (that is, a low-side gear ratio) larger than a maximum gear ratio (that is, the lowest gear ratio that is the lowest vehicle speed-side gear ratio) γmax that is established by the continuously variable transmission 24. For example, the gear ratio γ1 corresponds to a first speed gear ratio that is the gear ratio of a first gear stage in the power transmission system 16, and the lowest gear ratio γmax of the continuously variable transmission 24 corresponds to a second speed gear ratio that is the gear ratio of a second gear stage in the power transmission system 16. Therefore, for example, the gear driving mode and the belt driving mode are changed in accordance with a shift line to change between the first gear stage and the second gear stage in a shift map of a known stepped transmission. For example, in the belt driving mode, the gear ratio γ is changed on the basis of a traveling state, such as an accelerator operation amount θacc and a vehicle speed V, by using a known method. In changing from the gear driving mode to the belt driving mode (high vehicle speed) or changing from the belt driving mode (high vehicle speed) to the gear driving mode, the change is carried out via a belt driving mode (intermediate vehicle speed) shown in FIG. 2 transitionally.

For example, when the driving pattern is changed from the gear driving mode to the belt driving mode (high vehicle speed), the operation state is transitionally changed from the state where the forward clutch C1 and the dog clutch D1, corresponding to the gear driving mode, are engaged to the belt driving mode (intermediate vehicle speed) that is the state where the belt driving clutch C2 and the dog clutch D1 are engaged. That is, a clutch engagement changing shift (for example, clutch-to-clutch shift) is carried out so as to release the forward clutch C1 and engage the belt driving clutch C2. At this time, the power transmission path is changed from the second power transmission path to the first power transmission path, and the power transmission system 16 is substantially upshifted. After the power transmission path is changed, the dog clutch D1 is released in order to prevent an unnecessary drag or high rotation of the gear mechanism 28, or the like (see interruption of driven input in FIG. 2). In this way, the dog clutch D1 functions as a driven input interrupting clutch that interrupts input from the drive wheels 14 side.

For example, when the driving pattern is changed from the belt driving mode (high vehicle speed) to the gear driving mode, the operation state is further transitionally changed from the state where the belt driving clutch C2 is engaged to the belt driving mode (intermediate vehicle speed) bat is the state where the dog clutch D1 is engaged in preparation for changing into the gear driving mode (see downshift preparation in FIG. 2). In the belt driving mode (intermediate vehicle speed), rotation is also transmitted to the sun gear 26s of the planetary gear train 26p via the gear mechanism 28. When a clutch engagement changing shift (for example, clutch-to-clutch shift) is carried out so as to release the belt driving clutch C2 and engage the forward clutch C1 from the state of the belt driving mode (intermediate vehicle speed), the driving pattern is changed to the gear driving mode. At this time, the power transmission path is changed from the first power transmission path to the second power transmission path, and the power transmission system 16 is substantially downshifted.

Figure 3A:
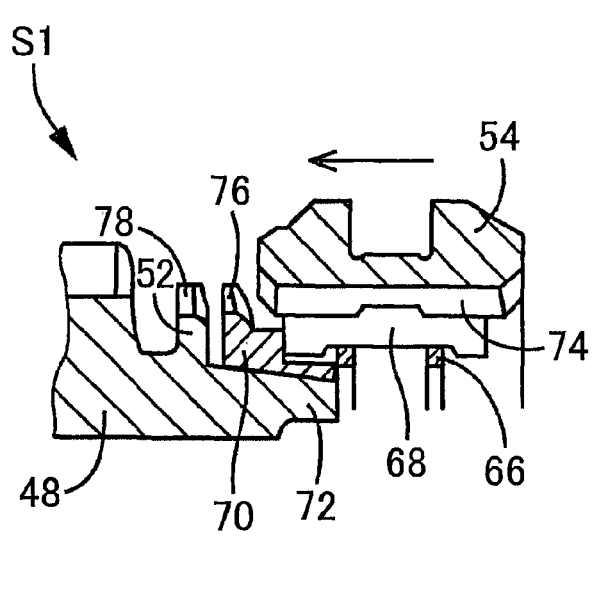
FIG. 3A and FIG. 3B are views that illustrate the configuration and operation of a synchromesh mechanism, and that show a state where a dog clutch is released.
Figure 3B:
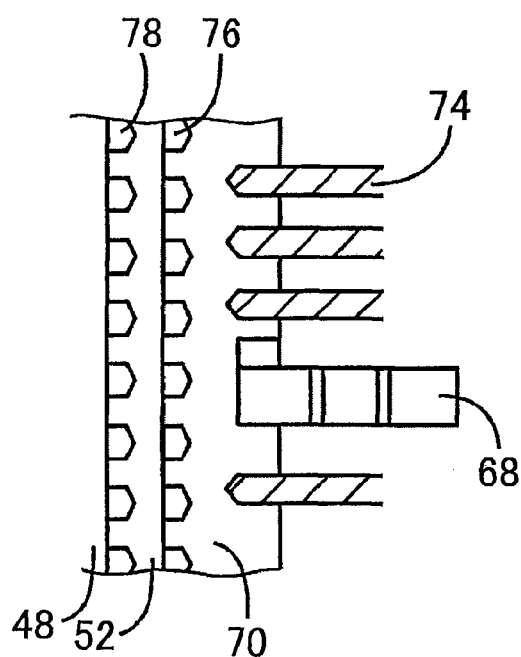
Figures 4A, 4B:
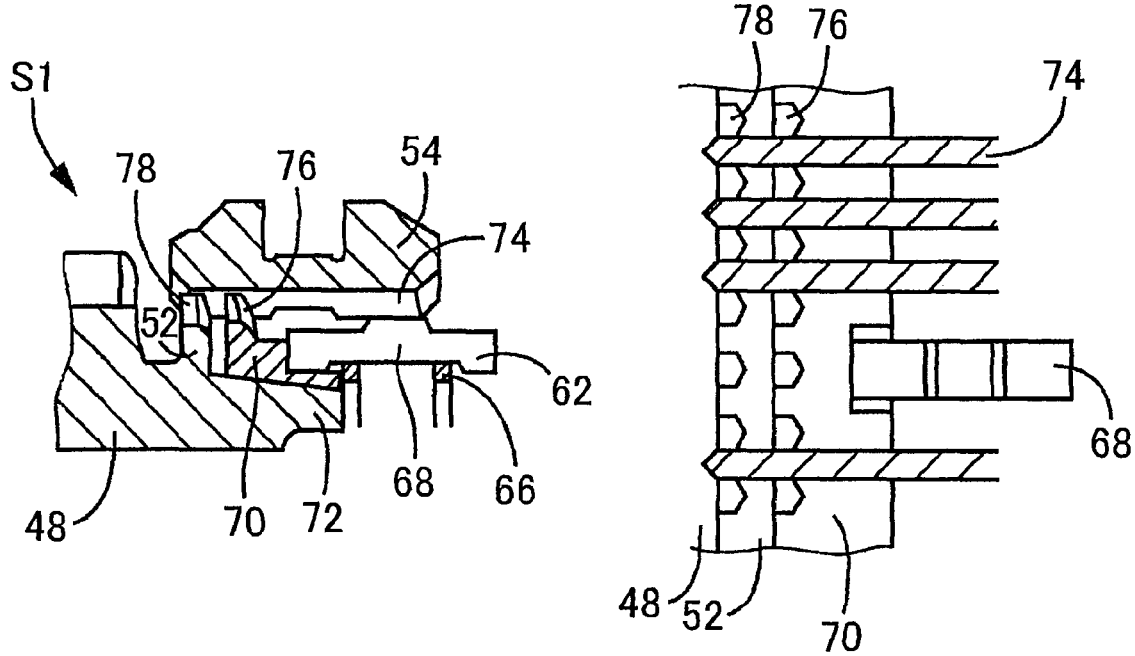
FIG. 4A and FIG. 4B are views that illustrate the configuration and operation of the synchromesh mechanism, and that show a state where the dog clutch is engaged.

FIG. 3A, FIG. 3B, FIG. 4A and FIG. 4B are views for illustrating the configuration and operation of the synchromesh mechanism S1. FIG. 3A and FIG. 3B show a state where the dog clutch D1 is released. FIG. 4A and FIG. 4B show a state where the dog clutch D1 is engaged. FIG. 3A and FIG. 4A are cross-sectional views of the synchromesh mechanism S1. FIG. 3B and FIG. 4B are developed views excluding a cylindrical portion of the hub sleeve 54 when the states of FIG. 3A and FIG. 4A are viewed from the radially outer side. As shown in FIG. 3A, the synchromesh mechanism S1 includes a key spring 66, a shifting key 68, a synchronizer ring 70 and a cone portion 72. The shifting key 68 is engaged with the hub sleeve 54 by the key spring 66. The synchronizer ring 70 is rotated together with the shifting key 68 with a predetermined play. The cone portion 72 is provided on the second gear 52. Spline teeth 74 that serve as internal teeth are provided on the inner periphery of the hub sleeve 54. The spline teeth 74 are spine-fitted to the first gear 50. The hub sleeve 54 is constantly integrally rotated together with the first gear 50. When the hub sleeve 54 is moved leftward in the drawing, the synchronizer ring 70 is pressed against the cone portion 72 via the shifting key 68, and power from the first gear 50 is transmitted to the second gear 52 by friction therebetween. When the hub sleeve 54 is further moved leftward, the spline teeth 74 are, meshed with the spline teeth 76 provided on the synchronizer ring 70 and the spline teeth 78 provided on the second gear 52, as shown in FIG. 4A and FIG. 4B. Thus, the first gear 50 and the second gear 52 are integrally connected, and the power transmission path is established between the forward/reverse switching device 26 and the output shaft 30.

Figure 5:
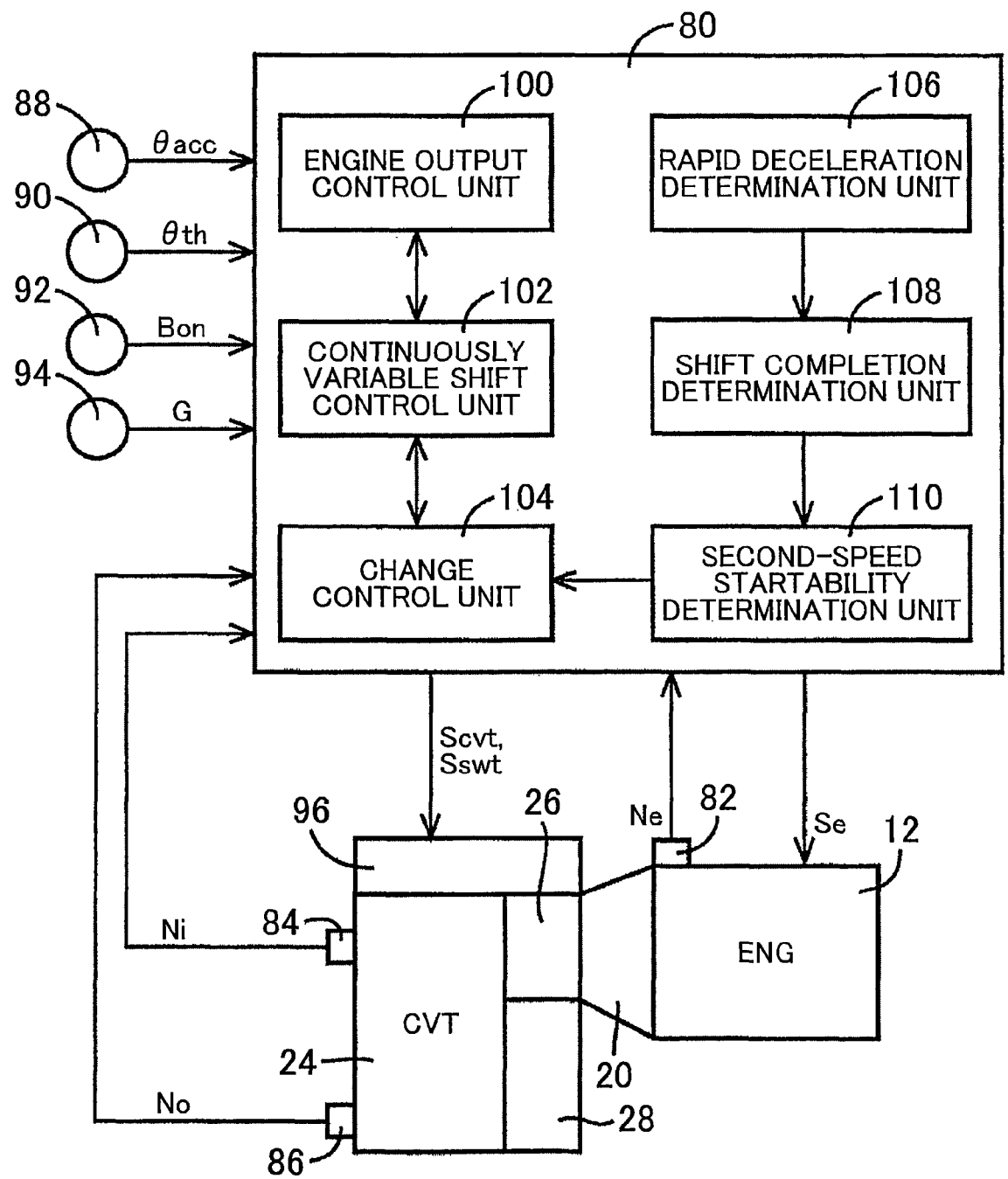
FIG. 5 is a view that illustrates a relevant portion of control functions and control system for various controls in the vehicle.

FIG. 5 is a view that illustrates a relevant portion of control functions and control system for various controls in the vehicle 10. As shown in FIG. 5, the vehicle 10 includes an electronic control unit 80 including, for example, a control unit for the vehicle 10. The control unit changes the driving pattern of the power transmission system 16. Thus, FIG. 5 is a view that shows input/output lines of the electronic control unit 80, and is a functional block diagram that illustrates a relevant portion of control functions implemented by the electronic control unit 80. The electronic control unit 80 includes a so-called microcomputer. The microcomputer includes, for example, a CPU, a RAM, a ROM, input/output interfaces, and the like. The CPU executes various controls over the vehicle 10 by executing signal processing in accordance with programs prestored in the ROM while utilizing a temporary storage function of the RAM. For example, the electronic control unit 80 is configured to execute output control over the engine 12, shift control and belt clamping force control over the continuously variable transmission 24, control for changing the driving pattern, and the like. Where necessary, the electronic control unit 80 is split into an electronic control unit for controlling the engine, an electronic control unit for controlling the continuously variable transmission, an electronic control unit for changing the driving pattern, and the like.

Various actual values based on detected signals by various sensors are supplied to the electronic control unit 80. The various sensors include, for example, various rotation speed sensors 82, 84, 86, an accelerator operation amount sensor 88, a throttle valve opening degree sensor 90, a foot brake switch 92, a G sensor 94, and the like. The various actual values include, for example, an engine rotation speed Ne, an input shaft rotation speed Ni, an output shaft rotation speed No, the accelerator operation amount θacc, a throttle valve opening degree θth, a brake on signal Bon, a longitudinal acceleration, G of the vehicle 10, and the like. The input shaft rotation speed Ni is the rotation speed of the primary pulley 58, and corresponds to a turbine rotation speed Nt. The output shaft rotation speed No is the rotation speed of the secondary pulley 62, and corresponds to the vehicle speed V. The accelerator operation amount θacc is the operation amount of an accelerator pedal, which is a driver's required acceleration amount. The brake on signal Bon is a signal indicating a state where a foot brake that is a service brake is operated.

An engine output control command signal Se, a hydraulic control command signal Scvt, a hydraulic control command signal Sswt, and the like, are output from the electronic control unit 80. The engine output control command signal Se is used for output control over the engine 12. The hydraulic control command signal Scvt is used for hydraulic control associated with a shift of the continuously variable transmission 24. The hydraulic control command signal Sswt is used to control the forward/reverse switching device 26, the belt driving clutch C2 and the dog clutch D1 associated with a change of the driving pattern of the power transmission system 16. Specifically, a throttle signal, an injection signal, an ignition timing signal, and the like, are output as the engine output control command signal Se. The throttle signal is used to control the open/close of the electronic throttle valve by driving a throttle actuator. The injection signal is used to control the amount of fuel that is injected from a fuel injection device. The ignition timing signal is used to control the ignition timing of the engine 12 by an ignition device. A command signal for driving a solenoid valve that regulates a primary pressure Pin, a command signal for driving a solenoid valve that regulates a secondary pressure Pout, and the like, are output to a hydraulic control circuit 96 as the hydraulic control command signal Scvt. The primary pressure Pin is supplied to the actuator of the primary pulley 58. The secondary pressure Pout is supplied to the actuator of the secondary pulley 62. Command signals, and the like, for respectively driving solenoid valves that control hydraulic pressures that are supplied to the forward clutch C1, the reverse brake B1, the belt driving clutch C2, the actuator for actuating the hub sleeve 54, and the like, are output to the hydraulic control circuit 96 as the hydraulic control command signal Sswt.

The electronic control unit 80 includes an engine output control unit 100, that is, engine output control means, a continuously variable shift control unit 102, that is, continuously variable shift control means, and a change control unit 104, that is, change control means.

The engine output control unit 100, for example, outputs the engine output control command signal Se to the throttle actuator, the fuel injection device and the ignition device in order to execute output control over the engine 12. The engine output control unit 100, for example, sets a target engine torque Tetgt for obtaining a required driving force (which means the same as a required driving torque) on the basis of the accelerator operation amount θacc and the vehicle speed V. The engine output control unit 100 controls not only the open/close of the electronic throttle valve by the throttle actuator but also the fuel injection amount by the fuel injection device and the ignition timing by the ignition device so that the target engine torque Tetgt is obtained.

The continuously variable shift control unit 102 controls the gear ratio γ of the continuously variable transmission 24 so that a target gear ratio γtgt is obtained in the belt driving mode. The target gear ratio γtgt is calculated on the basis of the accelerator operation amount θacc, the vehicle speed V, the brake on signal Bon, and the like. Specifically, the continuously variable shift control unit 102 determines a primary command pressure Pintgt and a secondary command pressure Pouttgt so that the target gear ratio γtgt of the continuously variable transmission 24 is achieved while a belt slip of the continuously variable transmission 24 does not occur. The target gear ratio γtgt is set so that the operating point of the engine 12 is on an optimal line. The primary command pressure Pintgt is a command value of the primary pressure Pin. The secondary command pressure Pouttgt is a command value of the secondary pressure Pout. The continuously variable shift control unit 102 outputs the primary command pressure Pintgt and the secondary command pressure Pouttgt to the hydraulic control circuit 96.

The change control unit 104 executes change control for changing the driving pattern between the gear driving mode and the belt driving mode as needed. In the gear driving mode, power of the engine 12 is transmitted to the output shaft 30 via the gear mechanism 28. In the belt driving mode, power of the engine 12 is transmitted to the output shaft 30 via the continuously variable transmission 24.

Specifically, the change control unit 104 determines whether to change the driving pattern during vehicle traveling. For example, the change control unit 104 determines whether to shift (change the gear ratio) on the basis of the vehicle speed V and the accelerator operation amount θacc by using an upshift line and a downshift line for changing between the first speed gear ratio and the second speed gear ratio, and determines whether to change the driving pattern during vehicle traveling on the basis of the determined result. The first speed gear ratio corresponds to the gear ratio γ1 in the gear driving mode. The second speed gear ratio corresponds to the lowest gear ratio γmax in the belt driving mode. The upshift line and the downshift line are, for example, empirically obtained or obtained by design and stored in advance (that is, predetermined) shift lines, and have a predetermined hysteresis.

When the change control unit 104 determines to change the driving pattern, the change control unit 104 changes the driving pattern. For example, when the change control unit 104 determines to upshift during traveling in the gear driving mode, the change control unit 104 switches driving mode from the gear driving mode to the belt driving mode (high vehicle speed). When the change control unit 104 changes from the gear driving mode to the belt driving mode (high vehicle speed), the change control unit 104 initially carries out an upshift through a clutch-to-clutch shift for releasing the forward clutch C1 and engaging the belt driving clutch C2. This state corresponds to the belt driving mode (intermediate vehicle speed) into which the driving pattern is transitionally changed in FIG. 2. The power transmission path in the power transmission system 16 changes from the second power transmission path, through which power is transmitted via the gear mechanism 28, to the first power transmission path, through which power is transmitted via the continuously variable transmission 24. Subsequently, the change control unit 104 changes into the belt driving mode (high vehicle speed) by outputting a command to actuate the hub sleeve 54 of the synchromesh mechanism S1 such that the engaged dog clutch D1 is released. The hub sleeve 54 is driven by a hydraulic actuator (not shown), and a pressing force that is applied to the hub sleeve 54 is adjusted by a hydraulic pressure that is supplied to the hydraulic actuator.

When the change control unit 104 determines to downshift during traveling in the belt driving mode (high vehicle speed), the change control unit 104 changes from the belt driving mode (high vehicle speed) to the gear driving mode. When the change control unit 104 changes from the belt driving mode (high vehicle speed) to the gear driving mode, the change control unit 104 initially changes into the belt driving mode (intermediate vehicle speed) by outputting a command to actuate the hub sleeve 54 of the synchromesh mechanism S1 so that the released dog clutch D1 is engaged. Subsequently, the change control unit 104 carries out a downshift through a clutch-to-clutch shift for releasing the belt driving clutch C2 and engaging the forward clutch C1. This state corresponds to the gear driving mode in FIG. 2. The power transmission path in the power transmission system 16 is changed from the first power transmission path, through which power is transmitted via the continuously variable transmission 24, to the second power transmission path, through which power is transmitted via the gear mechanism 28. In this way, when the change control unit 104 changes from transmission of power via the continuously variable transmission 24 to transmission of power via the gear mechanism 28 while the vehicle 10 is traveling, the dog clutch D1 and the belt driving clutch C2 is actuated such the dog clutch D1 engages and then the belt driving clutch C2 is released.

In control for transitionally changing into the belt driving mode (intermediate vehicle speed) as described above, the first power transmission path and the second power transmission path are changed only by exchanging torque through a clutch-to-clutch shift. Thus, a change shock is suppressed.

Incidentally, in changing from the belt driving mode (high vehicle speed) to the gear driving mode as described above, the dog clutch D1 is controlled to be engaged in advance of a downshift. In engaging the dog clutch D1, there is a case where an uplock occurs. In the uplock, the tooth tips of the spline teeth 74 of the hub sleeve 54 contact (collide with) the tooth tips of the spline teeth 76 of the synchronizer ring 70 or the tooth tips of the spline teeth 78 of the second gear 52, and the dog clutch D1 is not engaged. Such an uplock is particularly easy to occur when the synchromesh mechanism S1 is operated during a stop of the vehicle 10 where rotation of the second gear 52 is stopped (while the vehicle 10 is stationary). Therefore, in changing from the belt driving mode (high vehicle speed) to the gear driving mode as a result of a decrease in the vehicle speed V, if engagement operation of the dog clutch D1 has not completed because of a rapid deceleration, or the like, before the vehicle 10 stops (while the vehicle 10 is stopping), the synchromesh mechanism S1 is operated even after a stop of the vehicle 10, so an uplock is easy to occur.

In contrast, in the present embodiment, control operations of the electronic control unit 80 are suggested. The control operations reliably engage the dog clutch D1 even when the uplock occurs. That is, when the change control unit 104 changes from transmission of power via the continuously variable transmission 24 to transmission of power via the gear mechanism 28 in a state where the vehicle 10 stops in a state where power is transmitted via the continuously variable transmission 24, the change control unit 104 executes a series of engagement fault avoidance control for actuating the belt driving clutch C2 and actuating the dog clutch D1 such that the belt driving clutch C2 is released and the dog clutch D1 engages. Actuation of the dog clutch D1 to the engaged side (operation of the synchromesh mechanism S1) in the series of engagement fault avoidance control is, for example, carried out subsequently to the start of release of the belt driving clutch C2 in process of the release (that is, carried out substantially simultaneously with the release operation) or carried out after the release. Alternatively, operation of the synchromesh mechanism S1, which has been carried out before a stop of the vehicle, may be continuously carried out without a stop. The operations of the series of engagement fault avoidance control are executed irrespective of whether, there occurs an uplock, and correspond to the process of preventing an uplock and also correspond to the process of eliminating an uplock that is actually occurring. Thus, the above-described series of engagement fault avoidance control operations are executed at the time when a downshift is required and then the vehicle 10 is stopped without completion of the downshift (that is, while remaining in the belt driving mode irrespective of whether the dog clutch D1 is engaged, in other words, while remaining in the state of the first power transmission path). In this way, the above-described series of engagement fault avoidance control operations are not intended to engage the dog clutch D1 by eliminating an uplock after it is determined that there occurs the uplock in the dog clutch D1.

Specifically, the electronic control unit 80 further includes a rapid deceleration determination unit 106, that is, rapid deceleration determination means, and a shift completion determination unit 108, that is, shift completion determination means.

The rapid deceleration determination unit 106, for example, determines whether the vehicle 10 is rapidly decelerating at the time when the change control unit 104 determines to carry out a downshift. This rapid deceleration is, for example, such a deceleration state of the vehicle 10 that an actual deceleration exceeds a rapid, deceleration determination threshold determined in advance as a deceleration to such an extent that there is a possibility that a downshift does not complete before a stop of the vehicle. Thus, at the time of downshift determination (at the time of determining to change from the belt driving mode (high vehicle speed) to the gear driving mode resulting from a decrease in the vehicle speed V, the rapid deceleration determination unit 106 determines whether the vehicle 10 is rapidly decelerating on the basis of whether an actual deceleration of the vehicle 10, based on a change in the vehicle speed V, the longitudinal acceleration G, or the like, exceeds the rapid deceleration determination threshold.

The shift completion determination unit 108, for example, determines whether a downshift carried out by the change control unit 104 has completed. Specifically, after output of a downshift command by the change control unit 104, the shift completion determination unit 108 determines whether a downshift has completed on the basis of whether the input shaft rotation speed Ni is a rotation speed after completion of the downshift. Alternatively, the shift completion determination unit 108 may determine whether a downshift has completed on the basis of whether a downshift operation time has elapsed after output of a downshift command. The downshift operation time is determined in advance as a time during which the downshift reliably completes.

In addition, for example, when the rapid deceleration determination unit 106 has determined that the vehicle 10 is rapidly decelerating, the shift completion determination unit 108 determines whether a deceleration transitional time is longer than or equal to an allowable shift time. The deceleration transitional time is a time from a command to engage the dog clutch D1 by the change control unit 104 (a command to operate the synchromesh mechanism S1) to a stop of the vehicle 10. The allowable shift time is set such that a downshift is allowed to be actually carried out. The allowable shift time is, for example, a dog clutch engagement operation time that is determined in advance as a time during which engagement of the dog clutch D1 reliably completes after output of a command to operate the synchromesh mechanism S1. When the shift completion determination unit 108 has determined that the deceleration transitional time is longer than or equal to the allowable shift time, the change control unit 104 starts a downshift. Even when the deceleration transitional time is shorter than the allowable shift time, engagement of the dog clutch D1 is not always incomplete. Thus, this determination by the shift completion determination unit 108 is to determine whether the vehicle 10 stops (the vehicle 10 is stationary) in a state where power is transmitted via the continuously variable transmission 24 (that is, while remaining in the belt driving mode without carrying out a downshift), and is not to determine whether engagement of the dog clutch D1 has completed.

When the shift completion determination unit 108 has determined that the deceleration transitional time is shorter than the allowable shift time, the change control unit 104 outputs a command to release the belt driving clutch C2. Thus, because the vehicle 10 stops in a state where power is transmitted via the continuously variable transmission 24, shaft torsional torque that is generated in the first power transmission path is released. When the shaft torsional torque is released, for example, the second gear 52 can be rotated by the amount of a backlash of a meshing portion between gears in the power transmission path on the drive wheels 14 side with respect to the belt driving clutch C2. The change control unit 104 outputs a command to operate the synchromesh mechanism S1 so that the dog clutch D1 is actuated to the engaged side together with release of the belt driving clutch C2 (or after release of the belt driving clutch C2). At this time, if there occurs an uplock in the dog clutch D1 (synchromesh mechanism S1), because the second gear 52 is rotated, the uplock is eliminated, and the dog clutch D1 can be engaged. In addition, the change control unit 104 outputs a command to engage the forward clutch C1 after output of a command to operate the synchromesh mechanism S1.

Even in a state where the vehicle 10 stops in a state where power is transmitted via the continuously variable transmission 24, unless the start of the vehicle requires large driving force, it is presumable that the vehicle 10 is allowed to start moving while remaining in the belt driving mode without executing a series of engagement fault avoidance control and carrying out a downshift. Therefore, when a lower-side gear ratio than the lowest gear ratio max that is established by the continuously variable transmission 24 is required in a state where the vehicle 10 stops in a state where power is transmitted via the continuously variable transmission 24, the change control unit 104 changes from transmission of power via the continuously variable transmission 24 to transmission of power via the gear mechanism 28. On the other hand, when a lower-side gear ratio than the lowest gear ratio γmax that is established by the continuously variable transmission 24 is not required in a state where the vehicle 10 stops in a state where power is transmitted via the continuously variable transmission 24, the change control unit 104 maintains transmission of power via the continuously variable transmission 24.

Specifically, the electronic control unit 80 further includes a second-speed startability determination unit 110, that is, second-speed startability determination means. For example, in a state where the vehicle 10 stops in a state where power is transmitted via the continuously variable transmission 24, the second-speed startability determination unit 110 determines whether the vehicle 10 is able to start moving while remaining in the belt driving mode (that is, to start moving at the second speed gear ratio corresponding to the lowest gear ratio γmax) on the basis of whether a place at which the vehicle 10 is stopped is a flat road having a predetermined gradient or lower. For example, in a state where the vehicle 10 stops in a state where power is transmitted via the continuously variable transmission 24, the second-speed startability determination unit 110 determines whether the vehicle 10 is able to start moving while remaining in the belt driving mode on the basis of whether the vehicle starts moving in a state where the amount of change or rate of change in the accelerator operation amount θacc is lower than a predetermined change. The predetermined gradient or predetermined change is, for example, a second-speed startability determination threshold that is determined in advance as an upper limit value of a gradient or accelerator operation amount change to such an extent that a required driving force is satisfied even by a relatively small driving force based on the lowest gear ratio γmax (corresponding to the second speed gear ratio). In other words, the predetermined gradient or predetermined change is, for example, a first-speed start request determination threshold that is determined in advance as a lower limit value of a gradient or an accelerator operation amount change to such an extent that the vehicle 10 is required to start moving at a relatively large driving force based on the gear ratio γ1 (corresponding to the first speed gear ratio) established by the gear mechanism 28.

When the second-speed startability determination unit 110 has determined that the vehicle 10 is not able to start moving while remaining in the belt driving mode, the change control unit 104 executes the series of engagement fault avoidance control, then carries out a downshift, and changes from transmission of power via the continuously variable transmission 24 to transmission of power via the gear mechanism 28. On the other hand, when the second-speed startability determination unit 110 has determined that the vehicle 10 is able to start moving while remaining in the belt driving mode, the change control unit 104 maintains transmission of power via the continuously variable transmission 24.

Figure 6A:
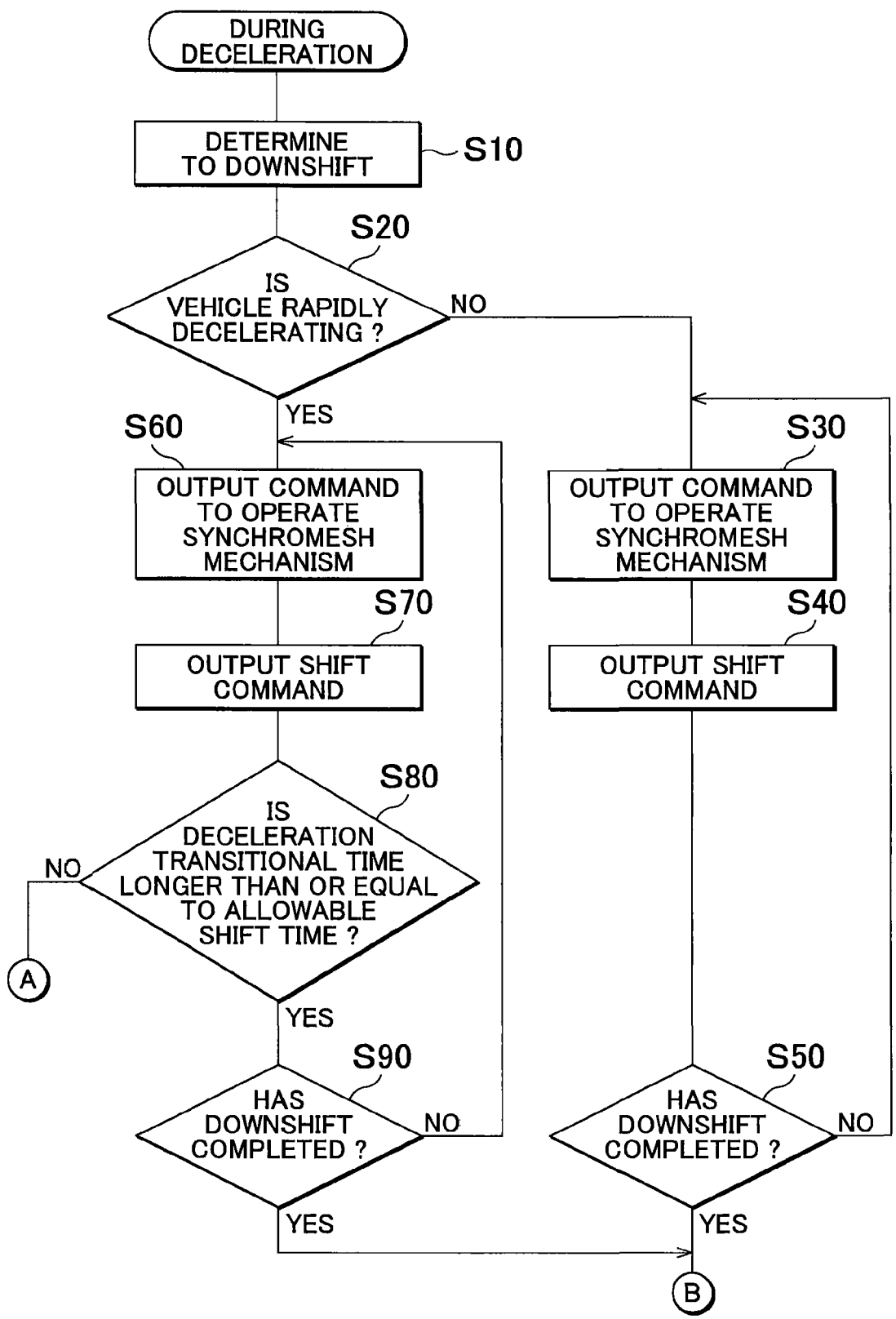
FIG. 6A and FIG. 6B are flowcharts that illustrates a relevant portion of control operations of an electronic control unit, that is, control operations for establishing a desired gear stage by appropriately avoiding an uplock of the dog clutch even during a stop of the vehicle.
Figure 6B:
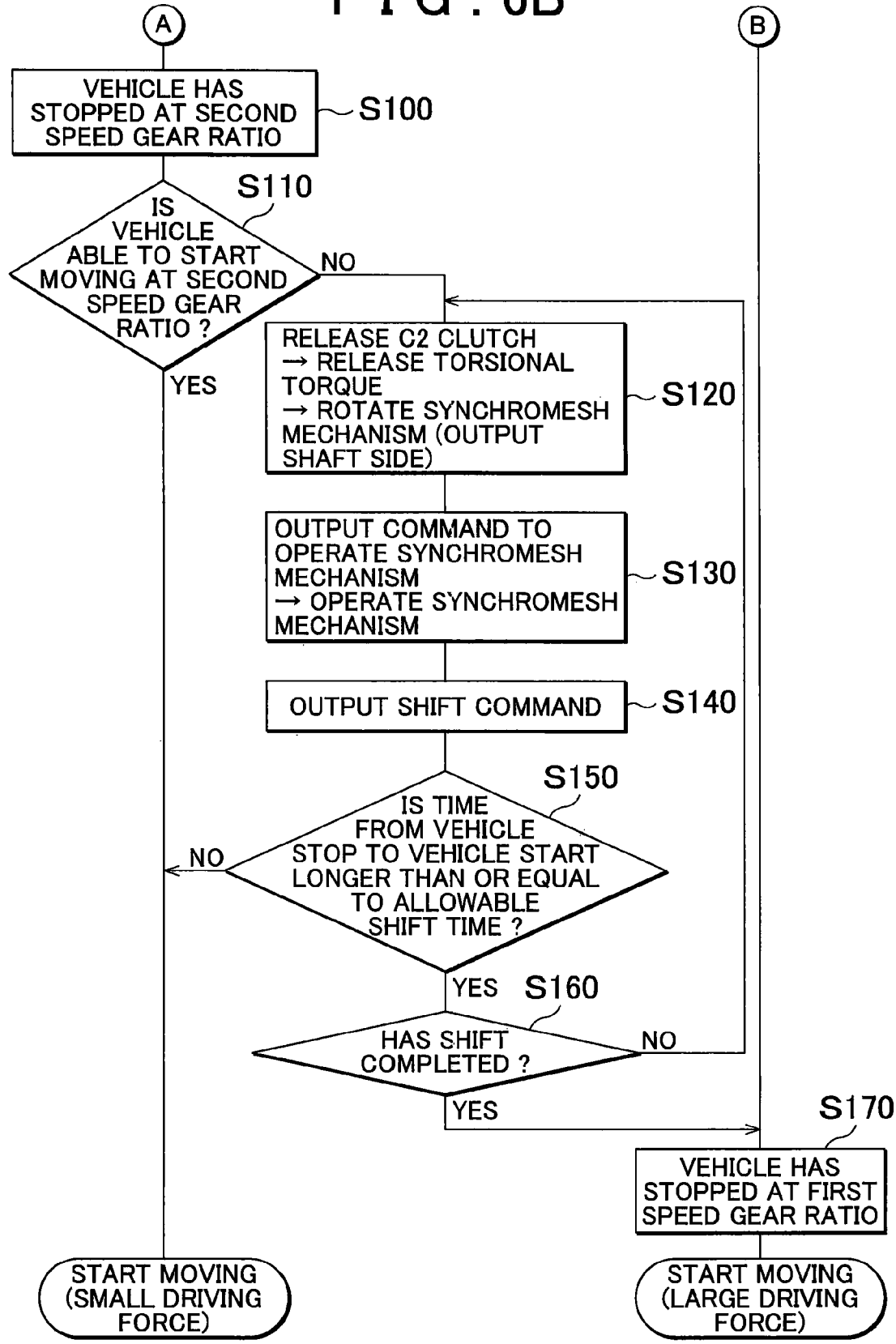
Figure 7:
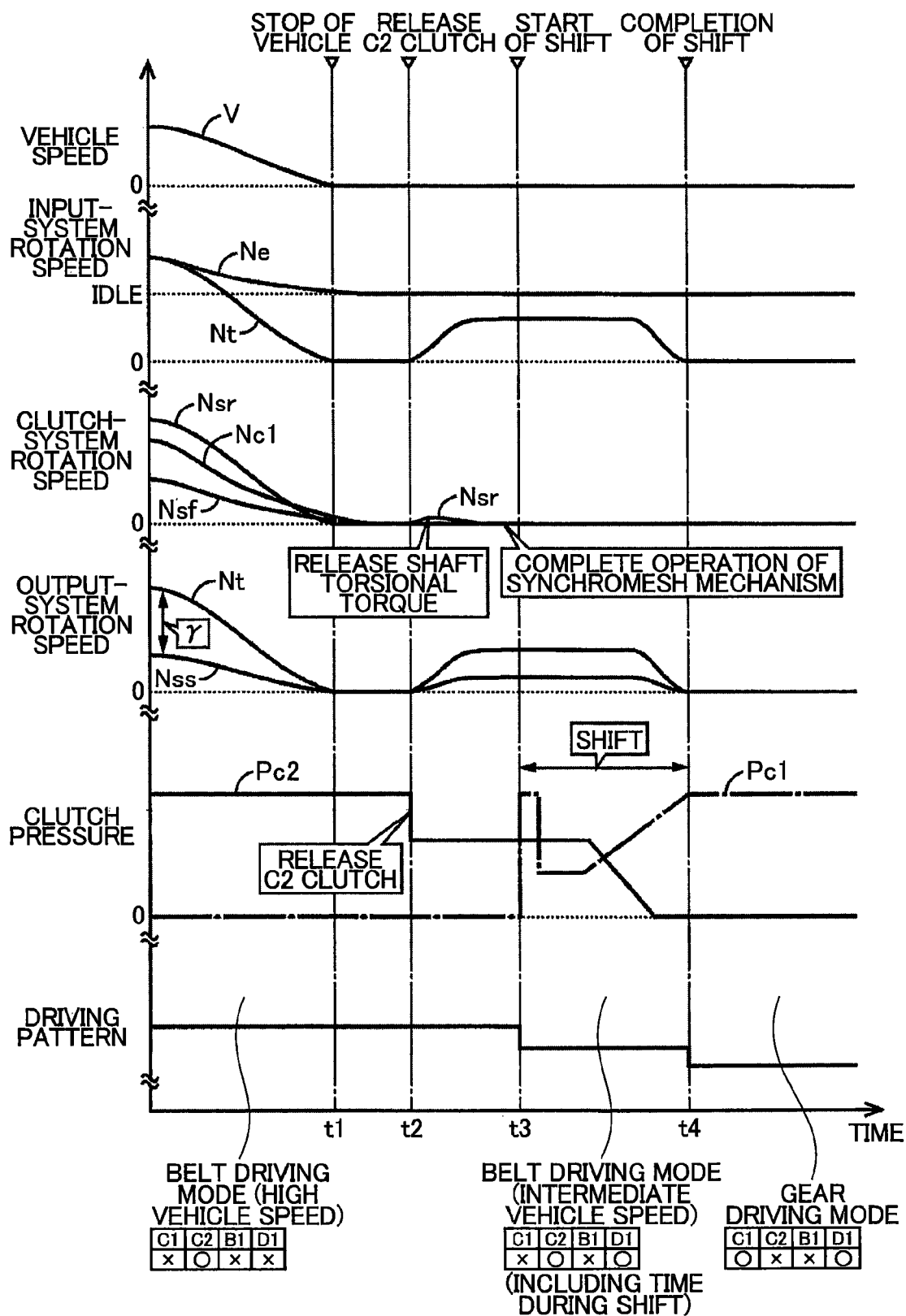
FIG. 7 is an example of a time chart in the case where the control operations shown in the flowchart of FIG. 6A and FIG. 6B are executed.

FIG. 6A and FIG. 6B are flowcharts that illustrates a relevant portion of control operations of the electronic control unit 80, that is, control operations for appropriately avoiding an uplock of the dog clutch D1 even during a stop of the vehicle and establishing a desired gear stage. This flowchart is repeatedly executed at an extremely short cycle time of about, for example, several milliseconds to several tens of milliseconds. FIG. 7 is an example of a time chart in the case where the control operations shown in the flowcharts of FIG. 6A and FIG. 6B are executed.

As shown in FIG. 6, initially, step (hereinafter, step is omitted) S10 corresponding to the change control unit 104, for example, indicates that it has been determined to downshift the power transmission system 16 while the vehicle is decelerating in the belt driving mode (high vehicle speed). Subsequently, in S20 corresponding to the rapid deceleration determination unit 106, for example, it is determined whether the vehicle 10 is rapidly decelerating. When negative determination is made in S20, a command to operate the synchromesh mechanism S1 is, for example, output so that the released dog clutch D1 is engaged in S30 corresponding to the change control unit 104. Subsequently, in S40 corresponding to the change control unit 104, a command is, for example, output to carry out a downshift through a clutch-to-clutch shift for releasing the belt driving clutch C2 and engaging the forward clutch C1. Subsequently, in S50 corresponding to the shift completion determination unit 108, for example, it is determined whether a downshift that is carried out after engagement of the dog clutch D1 has completed. When negative determination is made in S50, the process returns to S30. On the other hand, when affirmative determination is made in S20, a command to operate the synchromesh mechanism S1 is, for example, output so that the released dog clutch D1 is engaged in S60, corresponding to the change control unit 104. Subsequently, in S70 corresponding to the change control unit 104, a command is, for example, output to carry out a downshift through a clutch-to-clutch shift for releasing the belt driving clutch C2 and engaging the forward clutch C1. Subsequently, in S80 corresponding to the shift completion determination unit 108, for example, it is determined whether the deceleration transitional time is longer than or equal to the allowable shift time. When affirmative determination is made in S80, for example, it is determined in S90 corresponding to the shift completion determination unit 108 whether a downshift that is carried out after engagement of the dog clutch D1 has completed. When negative determination is made in S90, the process returns to S60. When negative determination is made in S80, no downshift is carried out. Therefore, S100 subsequent to this case, for example, indicates that the vehicle 10 stops at the second speed gear ratio corresponding to the lowest gear ratio γmax of the continuously variable transmission 24. Subsequently, in S110 corresponding to the second-speed startability determination unit 110, for example, it is determined whether the vehicle 10 is able to start moving at the second speed gear ratio. When negative determination is made in S110, for example, a command to release the belt driving clutch C2 is output in S120 corresponding to the change control unit 104. Thus, the shaft torsional torque that is generated in the first power transmission path is released, and the second gear 52 is rotated. Subsequently, in S130 corresponding to the change control unit 104, for example, a command to operate the synchromesh mechanism S1 is output so that the dog clutch D1 is actuated to the engaged side. Subsequently, in S140 corresponding to the change control unit 104, for example, a command is output to carry out a downshift by releasing the belt driving clutch C2 and engaging the forward clutch C1. Subsequently, in S150 corresponding to the shift completion determination unit 108, for example, it is determined whether a time from a stop of the vehicle to a start of movement of the vehicle is longer than or equal to the allowable shift time. When affirmative determination is made in S150, for example, it is determined in S160 corresponding to the shift completion determination unit 108 whether a downshift that is carried out after engagement of the dog clutch D1 has completed. When negative determination is made in S160, the process returns to S120. When affirmative determination is made in S50, when affirmative determination is made in S90 or when affirmative determination is made in S160, the downshift has completed. Therefore, S170 subsequent to this case, for example, indicates that the vehicle 10 is stopped at the gear ratio γ1 (corresponding to the first speed gear ratio) that is established by the gear mechanism 28. When the vehicle starts moving subsequently to S170, the vehicle is able to start moving at a relatively large driving force. When the vehicle starts moving subsequently to the case where affirmative determination is made in S110 or negative determination is made in S150, the vehicle 10 is caused to start moving at a relatively small driving force in the belt driving mode (for example, the second speed gear ratio corresponding to the lowest gear ratio γmax). Thus, when negative determination is made in S150, the belt driving clutch C2 released in S120 is engaged again. Therefore, in preparation for re-engagement of the belt driving clutch C2, in S120, it is desirable not to control the belt driving clutch C2 toward complete release but to control the belt driving clutch C2 toward a released state to such an extent that the belt driving clutch C2 is able to quickly have a torque capacity when hydraulic pressure is increased.

In FIG. 7, Nsr is the rotation speed of a rotating member (that is, the second gear 52) on the drive wheels 14 side in the dog clutch D1, Nsf is the rotation speed of a rotating member (that is, the first gear 50) on the gear mechanism 28 side in the dog clutch D1, Nc1 is the rotation speed of a rotating member (that is, the small-diameter gear 42) on the gear mechanism 28 side in the forward clutch C1, and Nss is the rotation speed of the secondary pulley 62 (that is, the rotary shaft 60). In FIG. 7, t1 timing indicates a state where the vehicle 10 stops (the vehicle 10 is stationary) without engagement of the dog clutch D1 due to an uplock. Therefore, at t2 timing, the belt driving clutch C2 is released. Thus, as shown from t2 timing to t3 timing, the shaft torsional torque that is generated in the first power transmission path is released, and the second gear 52 is rotated. For example, from t2 timing to t3 timing, when the synchromesh mechanism S1 is operated to the engaged side of the dog clutch D1, the uplock is eliminated, and the dog clutch D1 is engaged. A downshift is started at t3 timing after a lapse of a predetermined time from t2 timing, a downshift process is carried out from t3 timing to t4 timing, the downshift completes at t4 timing, and then the driving pattern shifts into the gear driving mode.

As described above, according to the present embodiment, while the vehicle 10 is traveling, it is possible to appropriately engage the dog clutch D1 in preparation for a change from transmission of power via the continuously variable transmission 24 to transmission of power via the gear mechanism 28. While the vehicle 10 is stopped, the shaft torsional torque that is generated in the first power transmission path as a result of a stop of the vehicle 10 in a state where power is transmitted via the continuously variable transmission 24 is released by releasing the belt driving clutch C2. Thus, it is possible to, for example, rotate the second gear 52 connected to the power transmission path on the drive wheels 14 side with respect to the belt driving clutch C2 by the amount of a backlash of the meshing portion between the gears in the power transmission path. Thus, even during a stop of the vehicle, it is possible to establish a desired gear stage by the gear mechanism 28 by appropriately avoiding an uplock of the dog clutch D1.

According to the present embodiment, in a situation that there is a possibility that a desired driving force suitable for the start of the vehicle in a vehicle state at that time is not obtained because the vehicle 10 stops in a state where power is transmitted via the continuously variable transmission 24, when the vehicle 10 is not allowed to start moving at the lowest gear ratio γmax that is established by the continuously variable transmission 24, transmission of power is changed from transmission of power via the continuously variable transmission 24 to transmission of power via the gear mechanism 28. Therefore, a desired driving force suitable for the start of the vehicle is obtained. When the vehicle 10 is allowed to start moving at the lowest gear ratio γmax that is established by the continuously variable transmission 24, transmission of power via the continuously variable transmission 24 is maintained. Therefore, a desired driving force suitable for the start of the vehicle is quickly obtained.

Next, another embodiment of the invention will be described. In the following description, like reference numerals denote portions common to the embodiments, and the description thereof is omitted.

In the series of engagement fault avoidance control according to the above-described first embodiment, the belt driving clutch C2 is released. This is to rotate the second gear 52 by the amount of a backlash of the meshing portion between the gears in the power transmission path on the drive wheels 14 side with respect to the belt driving clutch C2 by, for example, releasing the shaft torsional torque that is generated in the first power transmission path. In the present embodiment, in order to further reliably rotate the second gear 52, by re-engaging the belt driving clutch C2 in addition to release of the belt driving clutch C2, power is transmitted to the second gear 52. That is, when the belt driving clutch C2 is engaged again in a state where the engine 12 side rotating member (for example, the continuously variable transmission 24) of the belt driving clutch C2 is rotated by the engine 12 as a result of release of the belt driving clutch C2, it is possible to transmit power to the second gear 52 (in other words, it is possible to apply external force to the second gear 52). Thus, it is possible to further reliably rotate the second gear 52. Therefore, when the change control unit 104 according to the present embodiment changes from, transmission of power via the continuously variable transmission 24 to transmission of power via the gear mechanism 28 in a state where the vehicle 10 stops in a state where power is transmitted via the continuously variable transmission 24, the change control unit 104 executes a series of engagement fault avoidance control. In the series of engagement fault avoidance control, after the belt driving clutch C2 is released, the belt driving clutch C2 is engaged again, and the dog clutch D1 is actuated to the engaged side.

In addition, when the continuously variable transmission 24 is rotated by the engine 12 as a result of release of the belt driving clutch C2, the continuously variable transmission 24 is allowed to carry out a shift. Thus, it is possible to increase the rotation speed Nss of the secondary pulley 62 by upshifting the continuously variable transmission 24. In this state, when the belt driving clutch C2 is engaged again, it is possible to transmit further large power by the second gear 52. Therefore, when the change control unit 104 according to the present embodiment changes from transmission of power via the continuously variable transmission 24 to transmission of power via the gear mechanism 28 in a state where the vehicle 10 stops in a state where power is transmitted via the continuously variable transmission 24, the change control unit 104 may execute the series of engagement fault avoidance control. In the series of engagement fault avoidance control, after the continuously variable shift control unit 102 upshifts the continuously variable transmission 24 in a state where the belt driving clutch C2 is released, the belt driving clutch C2 is engaged again, and the dog clutch D1 is actuated to the engaged side.

Figure 8:
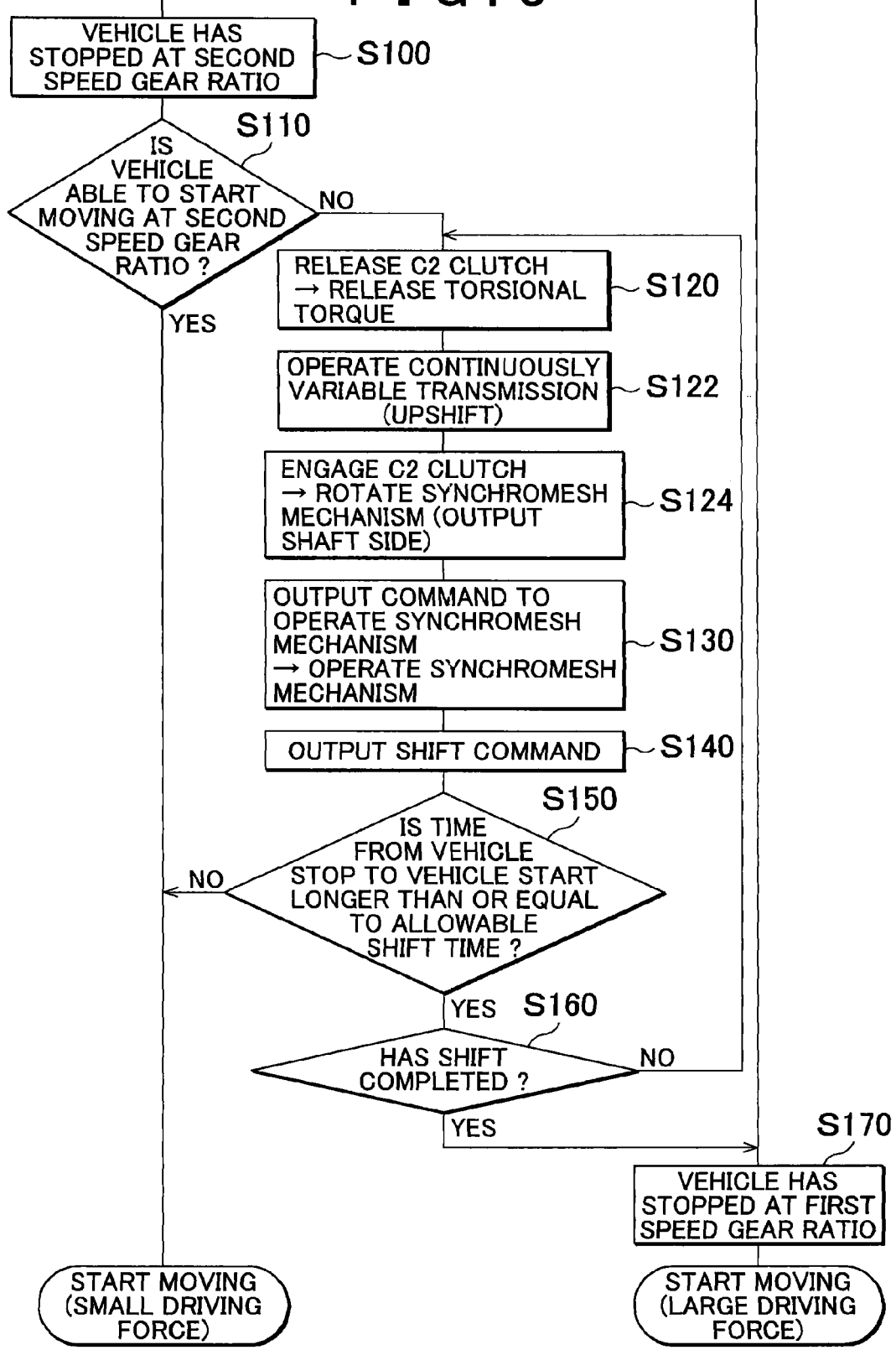
FIG. 8 is a flowchart that illustrates a relevant portion of control operations of the electronic control unit, that is, control operations for establishing a desired gear stage by appropriately avoiding an uplock of the dog clutch even during a stop of the vehicle, according to an embodiment different from that of FIG. 6A and FIG. 6B.
Figure 9:
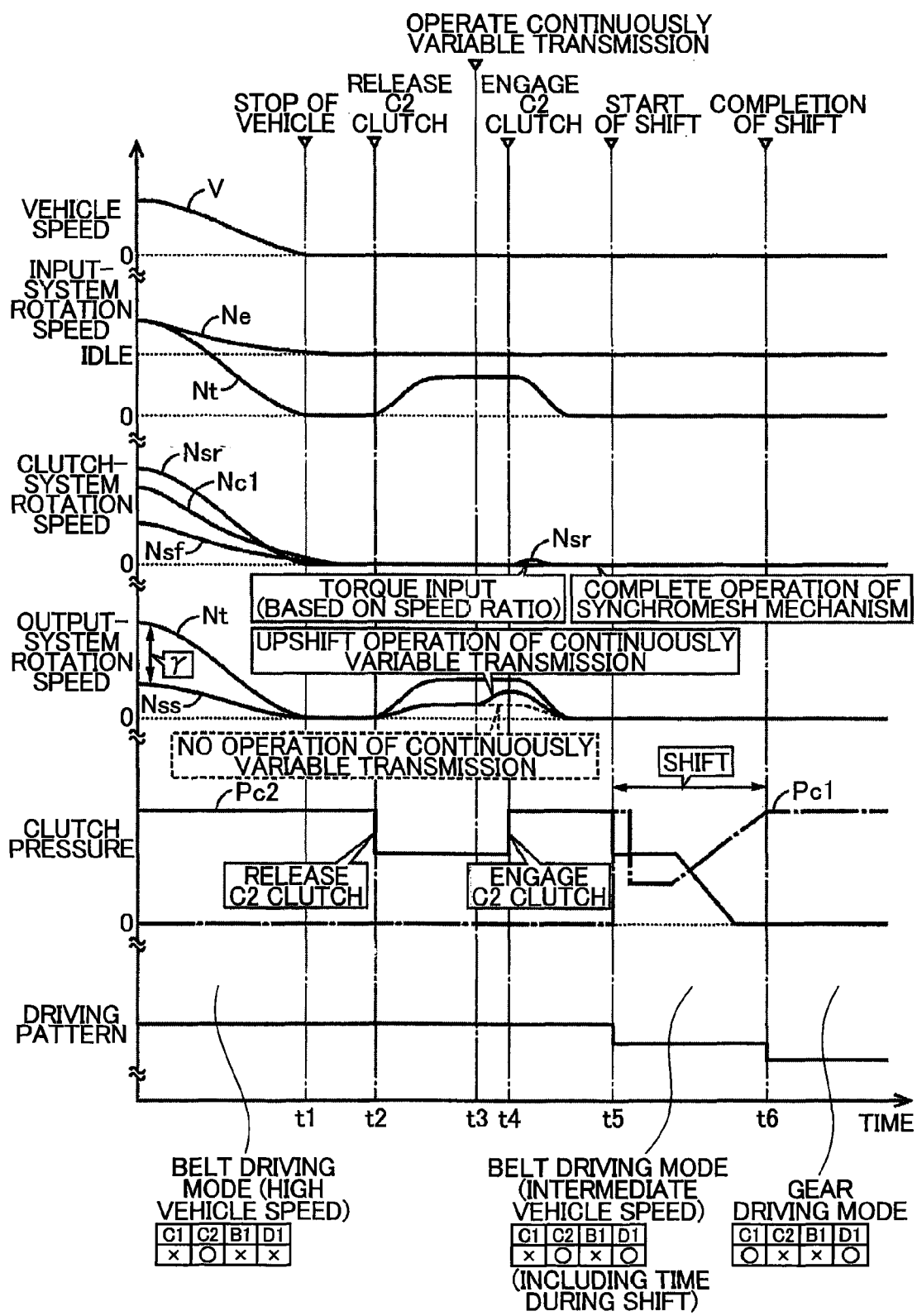
FIG. 9 is an example of a time chart in the case where the control operations shown in the flowchart of FIG. 8 are executed.

FIG. 8 is a flowchart that illustrates a relevant portion of control operations of the electronic control unit 80, that is, control operations for establishing a desired gear stage by appropriately avoiding an uplock of the dog clutch D1 even during a stop of the vehicle. This flowchart is repeatedly executed at an extremely short cycle time of about, for example, several milliseconds to several tens of milliseconds. FIG. 9 is an example of a time chart in the case where the control operations shown in the flowchart of FIG. 8 are executed. FIG. 8 shows the embodiment different from FIG. 6A and FIG. 6B. Hereinafter, portions different from FIG. 6A and FIG. 6B will be mainly described.

As shown in FIG. 8, when negative determination is made in S110, for example, a command to release the belt driving clutch C2 is output in S120 corresponding to the change control unit 104. Thus, the shaft torsional torque that is generated in the first power transmission path is released. Subsequently, in S122 corresponding to the continuously variable shift control unit 102, for example, the continuously variable transmission 24 is upshifted. Subsequently, in S124 corresponding to the change control unit 104, for example, a command to engage the belt driving clutch C2 is output. Thus, the second gear 52 is reliably rotated. Subsequently, in S130 corresponding to the change control unit 104, for example, a command to operate the synchromesh mechanism S1 is output so that the dog clutch D1 is actuated to the engaged side.

In FIG. 9, t1 timing indicates a state where the vehicle 10 stops without engagement of the dog clutch D1 due to an uplock. Therefore, at t2 timing, the belt driving clutch C2 is released. Thus, as shown from t2 timing to t3 timing, the continuously variable transmission 24 is rotated by the engine 12. In this state, from t3 timing to t4 timing, the continuously variable transmission 24 is upshifted, and the rotation speed Nss of the secondary pulley 62 is further increased as compared to the case where the continuously variable transmission 24 is not upshifted (see the dashed line). At t4 timing, the belt driving clutch C2 is engaged again. Thus, in comparison with the case where the continuously variable transmission 24 is not upshifted, further large power is input to the second gear 52, and the second gear 52 is further reliably rotated. For example, from t4 timing to t5 timing, when the synchromesh mechanism S1 is operated to the engaged side of the dog clutch D1, an uplock is eliminated, and the dog clutch D1 is engaged. A downshift is started at t5 timing after a lapse of a predetermined time from t4 timing, a downshift process is carried out from t5 timing to t6 timing, the downshift completes at t6 timing, and then the driving pattern shifts into the gear driving mode.

As described above, according to the present embodiment, by releasing the belt driving clutch C2, it is possible to rotate the continuously variable transmission 24 by the engine 12. By engaging the belt driving clutch C2 again in this state, it is possible to transmit power to the second gear 52 (in other words, it is possible to apply external force to the second gear 52). Thus, it is possible to further rotate the second gear 52, so it is possible to increase the probability of avoiding an uplock in the dog clutch D1 at the time when the dog clutch D1 is actuated to the engaged side.

According to the present embodiment, by releasing the belt driving clutch C2, it is possible to rotate the continuously variable transmission 24 by the engine 12, so it is allowed to shift the continuously variable transmission 24. In this state, by upshifting the continuously variable transmission 24, it is possible to increase the rotation speed Nss of the secondary pulley 62. By engaging the belt driving clutch C2 again, it is possible to apply further large external force to the second gear 52 in comparison with the case where the continuously variable transmission 24 is not upshifted. That is, it is possible to further effectively apply external force to the second gear 52. Thus, it is possible to further reliably rotate the second gear 52, so it is possible to further increase the probability of avoiding an uplock in the dog clutch D1 at the time when the dog clutch D1 is actuated to the engaged side.

The embodiments of the invention are described in detail with reference to the drawings. The invention is also applicable to another mode.

For example, in the above-described embodiments, irrespective of whether there occurs an uplock in the dog clutch D1, the series of engagement fault avoidance control is executed. However, the mode of execution of the series of engagement fault avoidance control is not limited to this configuration. For example, it may be determined whether there occurs an uplock in the dog clutch D1, and the series of engagement fault avoidance control may be executed when an uplock occurs. In such a case as well, the invention is applicable.

In the flowcharts shown in FIG. 6A, FIG. 6B and FIG. 8 in the above-described embodiments, it is determined in S110 whether the vehicle 10 is able to start moving at the second speed gear ratio, and the series of engagement fault avoidance control is executed when negative determination is made in S110. However, the mode of execution of the series of engagement fault avoidance control is not limited to this configuration. For example, the series of engagement fault avoidance control may be executed without determining whether the vehicle 10 is able to start moving at the second speed gear ratio. In the flowchart of FIG. 8, the continuously variable transmission 24 is upshifted in S122 between release of the belt driving clutch C2 in S120 and engagement of the belt driving clutch C2 in S124. However, the mode of an upshift of the continuously variable transmission 24 is not limited to this configuration. For example, the belt driving clutch C2 may be engaged after releasing the belt driving clutch C2 without upshifting the continuously variable transmission 24. In this way, in the flowcharts shown in FIG. 6A, FIG. 6B and FIG. 8, steps may be modified as needed without inconvenience, like, for example, S110 or S122 may be omitted.

In the above-described embodiments, the belt-type continuously variable transmission 24 is illustrated as the first transmission mechanism, and the belt driving clutch C2 is provided on the drive wheels 14 side with respect to the continuously variable transmission 24 (that is, between the secondary pulley 62 and the output shaft 30). However, the configuration of the first transmission mechanism is not limited to this configuration, and the arrangement of the belt driving clutch C2 is not limited to this configuration. For example, the first transmission mechanism may be a toroidal-type continuously variable transmission, or the like. When the continuously variable transmission 24 is not upshifted in the series of engagement fault avoidance control, the belt driving clutch C2 may be provided on the engine 12 side with respect to the continuously variable transmission 24 (that is, between the primary pulley 58 and the input shaft 22). Even in the case where the belt driving clutch C2 is provided between the primary pulley 58 and the input shaft 22, the shaft torsional torque that is generated in the first power transmission path is released when the belt driving clutch C2 is released. In addition, when the belt driving clutch C2 is engaged, it is possible to transmit power of the engine 12 to the second gear 52. When it is not indispensable to upshift the continuously variable transmission 24 in the series of engagement fault avoidance control, unless the continuously variable transmission 24 is set at the lowest gear ratio γmax at a stop of the vehicle, the continuously variable transmission 24 may be downshifted toward the lowest gear ratio γmax.

In the above-described embodiments, the gear mechanism 28 functions as a single-stage transmission. The gear mechanism 28 may be a stepped transmission that is shifted into two or more stages.

In the above-described embodiments, the driving pattern of the power transmission system 16 is changed by using the predetermined shift map. However, the mode of a change of the driving pattern is not limited to, this configuration. For example, the driving pattern of the power transmission system 16 may be changed by calculating a driver's required driving amount (for example, required torque) on the basis of the vehicle speed V and the accelerator operation amount θacc and then setting a gear ratio that satisfies the required torque.

In the above-described embodiments, the hub sleeve 54 is actuated by the hydraulic actuator. However, actuation of the hub sleeve 54 is not limited to this configuration. For example, the hub sleeve 54 may be actuated by an electric motor. In the dog clutch D1, the hub sleeve 54 is constantly fitted to the first gear 50. However, the dog clutch D1 is not limited to this configuration. For example, the dog clutch D1 may have such a structure that the hub sleeve 54 is constantly fitted to the second gear 52.

In the present embodiment, suitably, the first transmission mechanism is a known belt-type continuously variable transmission. A transmission of another type, such as a known planetary gear-type automatic transmission and a known traction-type continuously variable transmission, may be employed as the first transmission mechanism. The second transmission mechanism is an intermeshing gear mechanism by which a forward single gear ratio or multiple gear ratios are established. Power of the driving force source is transmitted to the first transmission mechanism and the second transmission mechanism via a fluid transmission device. A known forward/reverse switching device provided in series with the second transmission mechanism is provided in parallel with the first transmission mechanism. The engaged or released state of the dog clutch is changed by moving a sleeve in an axial direction by an actuator. A hydraulic actuator, an electric actuator, or the like, may be used as the actuator. The first clutch mechanism is a known hydraulic or electromagnetic friction clutch. The dog clutch (which may be not equipped with a synchromesh mechanism) may be employed as the first clutch mechanism. For example, a gasoline engine, a diesel engine, or the like, such as an internal combustion engine, is used as the driving force source. Another prime motor, such as an electric motor, may be employed solely or in combination with the engine, as the driving force source.

The above-described embodiments are only illustrative, and the invention may be implemented in modes including various modifications or improvements on the basis of the knowledge of persons skilled in the art.

What is claimed is:

1. A control apparatus for a vehicle, the vehicle including:
   a driving force source;
   at least one drive wheel;
   a first transmission mechanism provided on a first power transmission path, the first power transmission path being defined between the driving force source and the drive wheel;
   a second transmission mechanism provided on a second power transmission path, the second power transmission path being defined between the driving force source and the drive wheel, the second transmission mechanism being provided in parallel with the first transmission mechanism;
   a first clutch mechanism configured to transmit power or interrupt transmission of power in the first power transmission path; and
   a second clutch mechanism configured to transmit power or interrupt transmission of power in the second power transmission path, the second clutch mechanism being a dog clutch equipped with a synchromesh mechanism,
   the control apparatus comprising:
   an electronic control unit configured to
   (a) when the electronic control unit switches transmission of power from the first transmission path to the second transmission path while the vehicle is traveling, actuate the second clutch mechanism and the first clutch mechanism such that the second clutch mechanism engages from a released state and then the first clutch mechanism is released, and
   (b) when the electronic control unit switches the transmission of power from the first transmission path to the second transmission path in a state where the vehicle is stopping or is stationary and in a state where power of the driving force source is transmitted to the drive wheel via the first transmission mechanism, actuate the first clutch mechanism and the second clutch mechanism such that the first clutch mechanism is released and the second clutch mechanism engages from a released state.

2. The control apparatus according to claim 1, wherein the electronic control unit is configured to, when the electronic control unit switches the transmission of power from the first transmission path to the second transmission path in a state where the vehicle is stopping or is stationary and in a state where power of the driving force source is transmitted to the drive wheel via the first transmission mechanism, release the first clutch mechanism and then engage the first clutch mechanism again.

3. The control apparatus according to claim 2, wherein the first transmission mechanism is a continuously variable transmission mechanism, the first clutch mechanism is provided on the drive wheel side with respect to the first transmission mechanism, and
   the electronic control unit is configured to, when the electronic control unit switches the transmission of power from the first transmission path to the second transmission path in a state where the vehicle is stopping or is stationary and in a state where power of the driving force source is transmitted to the drive wheel via the first transmission mechanism, upshift the first transmission mechanism in a state where the first clutch mechanism is released and then engage the first clutch mechanism again.

4. The control apparatus according to claim 1, wherein a gear ratio that is established by the second transmission mechanism is a lower gear ratio than a lowest gear ratio that is established by the first transmission mechanism, and
   the electronic control unit is configured to
   (i) when the electronic control unit requires the gear ratio that is lower than the lowest gear ratio that is established by the first transmission mechanism in a state where the vehicle is stopping or is stationary and in a state where power of the driving force source is transmitted to the drive wheel via the first transmission mechanism, switch the transmission of power from the transmission of power via the first transmission mechanism to the transmission of power via the second transmission mechanism, and (ii) when the electronic control unit does not require the gear ratio that is lower than the lowest gear ratio that is established by the first transmission mechanism in a state where the vehicle is stopping or is stationary and in a state where power of the driving force source is transmitted to the drive wheel via the first transmission mechanism, maintain the transmission of power via the first transmission mechanism.

\* \* \* \* \*